(12) United States Patent
Magcale et al.

(10) Patent No.: US 10,852,805 B2
(45) Date of Patent: Dec. 1, 2020

(54) DATA CENTER TOTAL RESOURCE UTILIZATION EFFICIENCY (TRUE) SYSTEM AND METHOD

(71) Applicant: Nautilus Data Technologies, Inc., San Ramon, CA (US)

(72) Inventors: Arnold Magcale, Danville, CA (US); Daniel Kekai, San Ramon, CA (US)

(73) Assignee: Nautilus Data Technologies, Inc., Pleasanton, CA (US)

(*) Notice: Subject to any disclaimer, the term of this patent is extended or adjusted under 35 U.S.C. 154(b) by 121 days.

(21) Appl. No.: 15/663,782

(22) Filed: Jul. 30, 2017

(65) Prior Publication Data

US 2019/0033945 A1    Jan. 31, 2019

(51) Int. Cl.
  *G06F 1/3209* (2019.01)
  *G06F 11/34* (2006.01)
  *G06F 11/30* (2006.01)
  *G06F 9/50* (2006.01)

(52) U.S. Cl.
  CPC .......... *G06F 1/3209* (2013.01); *G06F 9/5094* (2013.01); *G06F 11/3006* (2013.01); *G06F 11/3062* (2013.01); *G06F 11/3409* (2013.01); *G06F 11/3442* (2013.01); *G06F 11/3452* (2013.01)

(58) Field of Classification Search
  CPC ... G06F 1/3209; G06F 9/5094; G06F 11/3409
  See application file for complete search history.

(56) References Cited

U.S. PATENT DOCUMENTS

| | | | | |
|---|---|---|---|---|
| 2009/0112522 | A1* | 4/2009 | Rasmussen | G06F 1/26 702/186 |
| 2010/0076607 | A1* | 3/2010 | Ahmed | G06F 1/206 700/276 |
| 2012/0232879 | A1* | 9/2012 | Iyengar | G06F 17/5009 703/21 |
| 2012/0303174 | A1* | 11/2012 | Szu | G06Q 10/063 700/297 |
| 2014/0074444 | A1* | 3/2014 | Hamann | G06F 30/13 703/2 |
| 2016/0013652 | A1* | 1/2016 | Li | H02J 3/32 307/24 |
| 2018/0026906 | A1* | 1/2018 | Balle | G06F 3/0613 709/226 |
| 2018/0204116 | A1* | 7/2018 | Evans | G06N 3/0454 |

* cited by examiner

*Primary Examiner* — Jaweed A Abbaszadeh
*Assistant Examiner* — Gayathri Sampath
(74) *Attorney, Agent, or Firm* — Michael D. Eisenberg

(57) ABSTRACT

Embodiments disclosed include methods and systems that adaptively, in real-time, evaluate data center performance, assess data center efficiency, data center sustainability, data center availability, compute performance, storage performance and provide data center customers with an overall data center performance rating, presented as a Total Resource Utilization Efficiency or TRUE score. Other embodiments of this aspect include corresponding computer systems, apparatus, and computer programs recorded on one or more computer storage devices, each configured to perform the actions of the methods. Other embodiments of the methods or systems include addition of newly defined metrics as categories or sub-categories to be used to calculate data center TRUE score.

5 Claims, 4 Drawing Sheets

DATA CENTER TOTAL RESOURCE UTILIZATION EFFICIENCY (TRUE) SYSTEM AND METHOD

CROSS REFERENCE TO RELATED APPLICATIONS

NA

BACKGROUND OF THE INVENTION

Field

The present invention generally relates to data centers, in particular to methods and systems to evaluate data center performance, assess data center efficiency, data center sustainability, data center availability, compute performance, storage performance and to provide data center customers with an overall data center performance rating.

Related Art

A data center is a facility used to house computer systems and associated components. The computer systems, associated components housed in data centers and the environmental control cooling systems therein, consume significant amounts of energy. With the typical modern data center requiring several megawatts (MW) of power to support and cool the computer systems and associated components therein, resource utilization efficiency has become critical to evaluating data center performance.

To support the power consumption of the computer systems, associated components housed in the data centers and environmental control cooling systems, data centers consume a significant amount of water annually. Data center cooling system efficiency is critical to reduce the number of liters of water used per kilowatt hour (kWh) of energy consumed by the computer systems and associated components housed in the data center. Data centers are key components of business continuity, with businesses heavily reliant on data center high availability to support mission critical data driven applications and services. Data center outages adversely impact business revenue. A single minute of a data center outage along with the time for recovering mission critical applications and services can mean thousands or millions of dollars of lost revenue. As such data center availability or uptime is another important factor in evaluating data center performance.

Prior art methods and systems have attempted to develop multi metric views to provide a broader understanding of data center performance. These multi metric views often take into account a single aspect of data center performance, Power Usage Effectiveness (PUE), a measure of how efficiently a data center uses energy. However, there still remains a need for a more nuanced and multi-dimensional metric that addresses the critical aspects of data center performance. In order to establish a more complete view of data center performance, there exists a requirement to assess key aspects of data center performance such as data center efficiency, data center availability and data center sustainability. There remains an additional need for a multi-dimensional metric that is easily scalable and that can accommodate additional new metrics in the future, as they are defined. Embodiments disclosed address precisely such a need.

SUMMARY

One general aspect includes a method and system of one or more computers configured to perform particular analysis of data center performance metrics and factors by virtue of having software, firmware, hardware, or combinations of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer automated system configured to adaptively, in real-time, assess multiple data center performance metrics and factors including but not limited to, data center efficiency, power usage effectiveness (PUE), water usage effectiveness (WUE), data center sustainability and environmental impact, greenhouse gas (GHG) intensity, carbon intensity, particulate matter intensity, water chemical intensity, compute performance, storage performance, data center location, climate zone, and data center availability.

Power usage effectiveness (PUE) is essentially a measure of how efficiently a data center uses energy; specifically, how much energy is used by the computing equipment in contrast to cooling and other overheads. PUE is the ratio of total amount of energy used by a computer data center facility to the energy delivered to computing equipment (compute system, storage system, networking system, etc.) Total Facility Energy equals everything beyond the Information Technology (IT) infrastructure (compute/storage/networking) equipment power usage.

Water usage effectiveness (WUE) is essentially a measure of how efficiently a data center uses water; specifically, how much water is used annually to cool the data center. Water usage effectiveness (WUE) is calculated using the annual data center water consumption and dividing it by the total annual energy consumption of the computer systems and associated components therein. The result of the calculation represents data center water consumption efficiency in the form of liters/kilowatt hour or L/kWh. Similar to Scope 1 and Scope 2 metrics for emissions, WUE takes into consideration both remote water usages at the power source generation and onsite water usage.

Environmental impact and sustainability is quantified using greenhouse gas (GHG) intensity, carbon intensity and particulate matter intensity. The intensity of each is a measurement of the number of units produced per megawatt hour (MWh).

Water chemical intensity is essentially a measure of how many units of chemicals are used annually at a data center for water treatment and is calculated using the number of units used for water treatment per megawatt hour (MWh)

Compute and storage performance is determined using well known benchmarks to calculate the maximum compute performance and storage performance within the data center power and cooling specifications.

Location and climate zones are factors in determining environmental impact, PUE and WUE efficiency Data center availability is essentially a measurement of the total annual downtime of a data center. This is a critical factor in determining risk assessment and evaluating overall data center performance.

Based on the determined values of multiple data center performance metrics and factors, the system will calculate a date center performance rating. This will be known as the data center Total Resource Utilization Efficiency, or TRUE Score.

Other embodiments of this aspect include corresponding computer systems, apparatus, and computer programs recorded on one or more computer storage devices, each configured to perform the actions of the methods.

DETAILED DESCRIPTION

Figure 1:
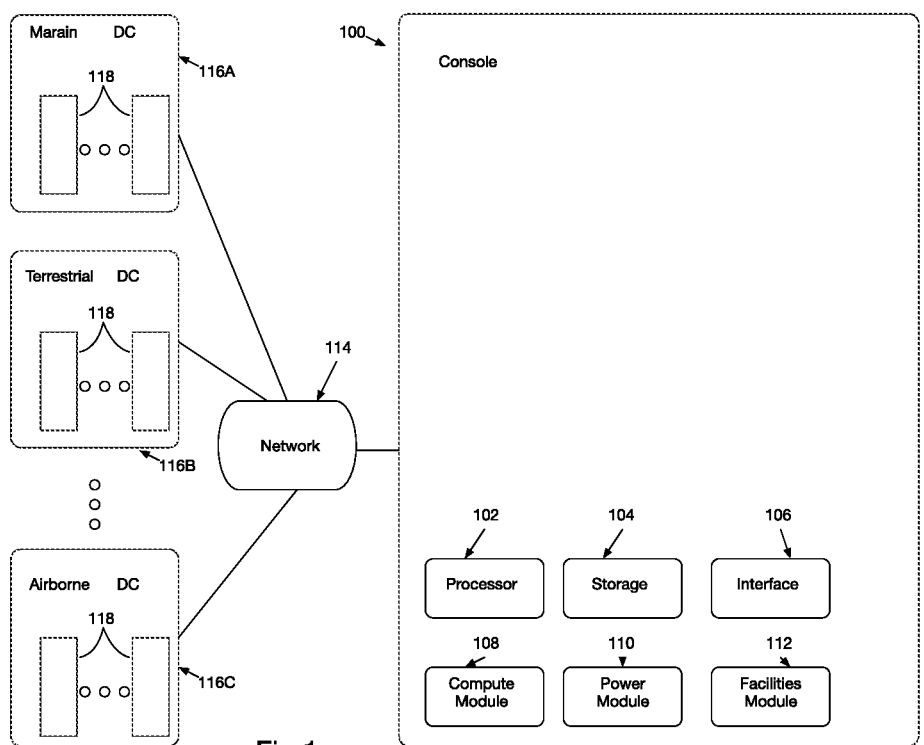
FIG. 1 illustrates an embodiment of the Data Center Infrastructure Management, or DCIM system.

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

As stated above, the traditional way of monitoring data center infrastructure, collecting data from infrastructure systems, and managing the systems to allow maximizing the operational efficiency is now struggling to cope with new challenges brought by the growing complexity of data centers. Embodiments disclosed include systems and methods that address these challenges effectively and efficiently.

According to an embodiment a computer automated system is configured to adaptively, in real-time, determine based on an operating condition of a compute system, a storage system, and a power management system housed in a facility, a maximum power unit efficiency or power usage effectiveness (PUE). The compute system and the storage system are comprised in a networked computer system comprising a plurality of processing units coupled to a corresponding plurality of memory elements having encoded thereon instructions implemented by the plurality of processing units. Based on the determined maximum power unit efficiency or power usage effectiveness (PUE), the computer automated system is configured to calibrate at least one of the compute system, the storage system, the power management system and the operating condition of the facility.

According to an embodiment of the computer automated system, determining the optimum power unit efficiency or power usage effectiveness (PUE) comprises further determining a total power requirement of the facility. Preferably, the computer automated system is further configured to determine a total power requirement of an input-output system also comprised in the facility, the compute system and the storage system comprised in the facility. Additionally, according to an embodiment, the computer automated system is further configured to determine a total area occupied by the facility. Preferably, the computer automated system can aggregate the total power requirement of the input-output system, the compute system and the storage system and is configured to determine and display a result. The result comprises the total power requirement divided by the aggregated total power requirement of the input-output system, the compute system and the storage system and further multiplied by the reciprocal of the determined total area occupied by the facility.

Power usage effectiveness (PUE) is essentially a measure of how efficiently a computer data center uses energy; specifically, how much energy is used by the computing equipment in contrast to cooling and other overheads. PUE is the ratio of total amount of energy used by a computer data center facility to the energy delivered to computing equipment (compute system, storage system, networking system, etc.) Total Facility Energy equals everything beyond the Information Technology (IT) infrastructure (compute/storage/networking) equipment power usage.

So, if the total power utilization for a data center is 2MW and the IT equipment power utilization is 1MW then the PUE is 2.0.

PUE=Total Facility Energy/IT Equipment Energy

Preferred embodiments include systems and methods for Total Resource Utilization Efficiency (TRUE) estimation, and optimization. The PUE is one of the critical components. However, the PUE is determined by and contributes towards determining other critical components in Total Resource Utilization Efficiency estimation and optimization. According to an embodiment, other variables include (but are not limited to) operating expense of a data center, kilowatts (KW) per rack based power consumption monitoring and optimization, Server utilization estimation and optimization, Network utilization estimation and optimization, Storage utilization estimation and optimization, and Watts consumed per unit area, for example, per square foot. Preferred embodiments further include Water Usage Effectiveness (WUE), Carbon Unit Effectiveness (CUE) and Total Carbon footprint of the data center. Alternatives to the above order and variables are possible, and even probably, as would be apparent to a person having ordinary skill in the art.

According to an embodiment, the computer automated system is configured to determine a real-time operating condition of the compute system. Based on the determined real-time operating condition of the computer system, the computer automated systems are further configured to calibrate the compute system to operate at a load that allows maximum energy efficiency. Preferably, the calibrating is based on a pre-defined data management policy comprising determining data to retain and a retention period required for the retained data, and accordingly determining data to migrate to another networked computer system in the facility or to another networked compute system in another networked facility.

FIG. 1 illustrates an embodiment of the Data Center Infrastructure Management (DCIM) System. The illustrated embodiment includes a processing unit 100 coupled to a memory element 104, and having instructions encoded thereon configured to: over a network 114, collect compute systems data, power systems data, and facility systems data from data centers 116A, 116B, and 116C. The disclosed embodiment is configured to trigger an action based on a diagnosed or predicted condition of the collected compute systems, power systems and facility systems. According to an embodiment, the configuration enables control of the compute systems, power systems and facility systems in each of the illustrated data centers via a corresponding centralized compute module 108, power module 110, and facilities module 112. Preferably, the control via the compute, power, and facilities module comprises calibrating the compute, power, and facility systems based on an estimated compute requirement, and an associated power, cooling, and network data resource requirement. According to an embodiment, the estimated compute requirement comprises estimating compute density per real-time power wattage, and storage density per real-time power wattage.

Figure 2:
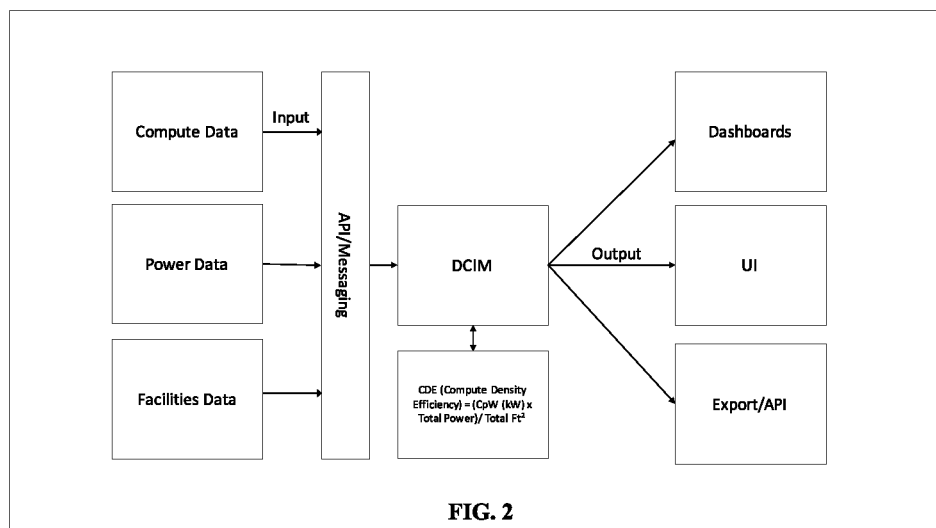
FIG. 2 illustrates a block diagram depicting data collection and compute density efficiency (CDE) calculation in the DCIM system.

FIG. 2 illustrates a block diagram depicting data collection and compute density efficiency (CDE) calculation in the DCIM system. With the compute data, power data and facilities data input into the DCIM system, the system estimates compute density per real-time power wattage, and storage density per real-time power wattage, and outputs the result to dashboards, networked User Interfaces and Export. According to an embodiment the Export could be presented in virtual reality and displayed on a smart phone, or other portable computing device.

According to an embodiment, the system is further configured to, based on the collected data center compute systems, power systems, and facility systems data, estimate a future compute systems condition, a future power systems condition, and a future facility systems condition as one type of Export showed in FIG. 2.

Figure 3:
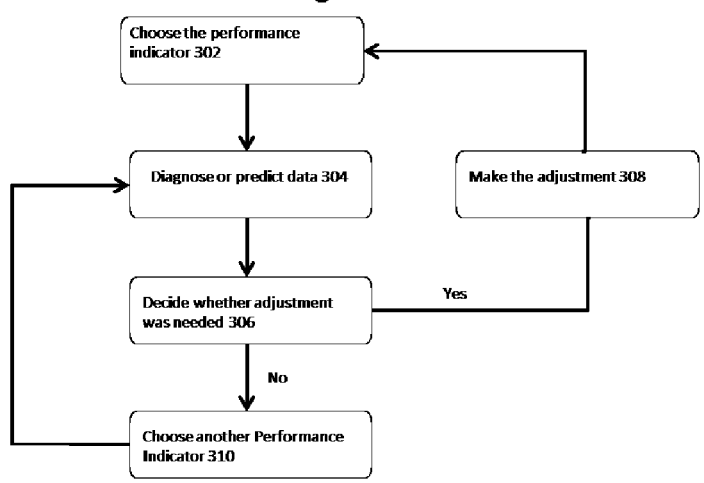
FIG. 3 depicts a logical view of the DCIM system according to an embodiment.

FIG. 3 illustrates via a flow diagram, the method of accommodating different metrics to adjust considering Performance Indicator to optimize the operation of the system. Step 302 includes choosing the considering Performance Indicator. In step 304, the related data is collected from the data center or predicted by the processor. In step 306, a decision is made based on the data aggregated in the memory from implemented machine learning to decide whether an adjustment or calibration is needed. Step 308 is implemented wherein an adjustment is made to the system. If the in the step 306 the metric is optimal, then the system proceeds to find or input manually another Performance Indicator and repeat the step 304 until the data center operation is optimized.

Figure 4:
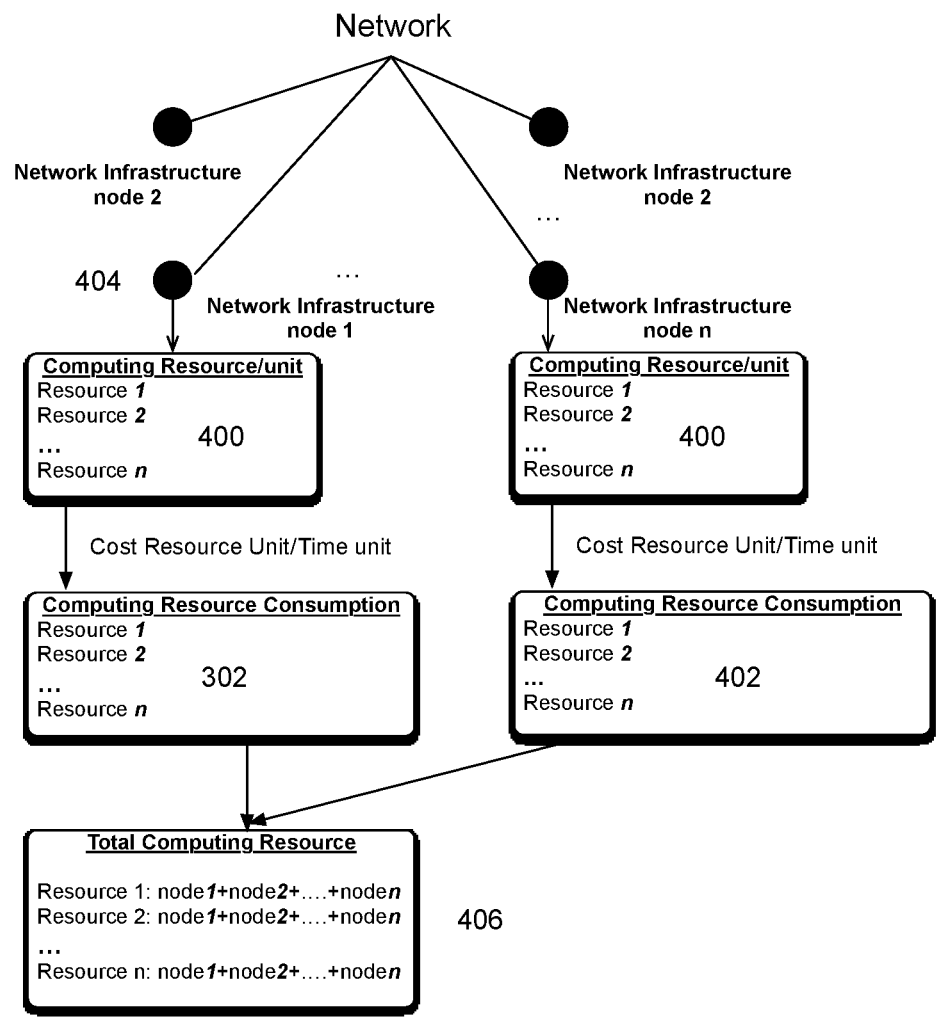
FIG. 4 depicts the system and method implementing complete computing resource consumption estimation over each node of a network of connected data centers.

FIG. 4 depicts the system and method implementing complete computing resource consumption estimation over each node of a network of connected data centers. Preferred embodiments implement Total Resource Utilization Efficiency (TRUE) optimizing not just compute resource consumption, but total efficiency of all components in a facility. According to the embodiment, the system is configured to: determine, for each compute system resource 400, a cost per predetermined time unit to deploy and operate the compute system resource, and to apply a cost conversion factor to each cost per predetermined time unit. Additionally, for each compute resource, the system generates an average number of resource units by averaging the number of resource units 402 over a plurality of network infrastructure nodes. And for an application executing on at least one of the network infrastructure nodes 404, the system generates a number of resource units used in a predetermined time period. Thus, the system can generate total resource consumption 406 by adding the number of units consumed by the application in the predetermined time period for each compute resource.

According to an embodiment, the computer automated system is configured to determine an air intake requirement and a humidity requirement, and based on pre-defined criteria, to raise or lower the air intake and humidity according to the determined requirement. Preferably the determination is made based on the determined real-time operating condition of the compute system, the storage system, and the power management system housed in the facility.

Embodiments disclosed include systems and methods to determine the real-time operating condition of the facility, and based on the determined real-time operating condition of the facility, the computer automated system is further configured to minimize the power requirement, wherein the minimization comprises automatic activation and deactivation of lighting equipment.

According to an embodiment, and based on the determined real-time operating condition the computer automated system is further configured to determine a heat generated via a plurality of temperature sensors or sensor elements, but preferably based on an operating load, and accordingly control a re-configurable cooling equipment in the facility. Preferred embodiments include machine learning and artificial intelligence capability enabling the computer automated system to predictively determine a heat generated based on current and anticipated loads, and accordingly anticipate state changes to optimize resource utilization. Additionally, the reconfigurable cooling equipment is configured to automatically scale up or down according to the operating load.

Embodiments disclosed include networked virtual reality interfaces enabling and facilitating remote inspection, calibration and control of the compute system, the storage system, the power system, and the facility.

According to an embodiment, the computer automated system is further configured to, based on the determined real-time operating condition of the compute system, the storage system, and the power management system housed in the facility, and accordingly based on a determined power requirement, deploy a modular uninterrupted power source supply, configured to optimize efficiency at partial or complete loads.

According to an embodiment, a computer implemented method comprising adaptively, in real-time, determining based on an operating condition of a compute system, a storage system, and a power management system housed in a facility, a maximum power unit efficiency or power usage effectiveness (PUE). Based on the determined maximum power unit efficiency or power usage effectiveness (PUE), the method comprises calibrating at least one of the compute system, the storage system, the power management system and the operating condition of the facility.

According to an embodiment, the computer implemented method further comprises determining an optimum power unit efficiency or power usage effectiveness (PUE). This further comprises determining a total power requirement of the facility. Preferably, determining the total power requirement of the facility further comprises determining a total power requirement of the input-output system, the compute system and the storage system comprised in the facility, and determining a total area occupied by the facility. Preferably the method comprises aggregating the total power requirement of the input-output system, the compute system and the storage system and determining and displaying a result. The result comprises comprising the total power requirement divided by the aggregated total power requirement of the input-output system, the compute system and the storage system and further multiplied by the reciprocal of the determined total area occupied by the facility.

According to an embodiment, and based on the determined real-time operating condition of the compute system, the method comprises calibrating the compute system to operate at a load that allows maximum energy efficiency; and wherein the calibrating is based on a pre-defined data management policy comprising determining data to retain and a retention period required for the retained data, and accordingly determining data to migrate to another networked compute system within the facility or to another networked compute system in another networked facility.

According to an embodiment, and based on the determined real-time operating condition of the compute system, the storage system, and the power management system housed in the facility, the computer implemented method further comprises determining an air intake requirement and a humidity requirement, and based on a pre-defined criteria, computer automated system is configured to trigger the raising or lowering of the air intake and humidity according to the determined requirement.

Embodiments disclosed include methods for automatic activation and deactivation of lighting equipment, according to a determined real-time operating condition.

According to an embodiment, and based on the determined real-time operating condition the computer automated system is further configured to determine a heat generated via a plurality of temperature sensors or sensor elements, but preferably based on an operating load, and accordingly control a re-configurable cooling equipment in the facility. Preferred embodiments include machine learning and artificial intelligence capability enabling the computer automated system to predictively determine a heat generated based on current and anticipated loads, and accordingly anticipate state changes to optimize resource utilization. Additionally, the reconfigurable cooling equipment is configured to automatically scale up or down according to the operating load.

Embodiments disclosed include networked virtual reality interfaces enabling and facilitating remote inspection, calibration and control of the compute system, the storage system, the power system, and the facility.

According to an embodiment, and based on the determined real-time operating condition of the compute system, the storage system, and the power management system housed in the facility, the computer automated system is further configured to based on a determined power requirement, deploy a modular uninterrupted power source supply, configured to operate at high efficiency modes at partial or complete loads.

According to an ideal embodiment, the system and method includes estimating the Total Resource Utilization Efficiency (TRUE) (registered trademark) of the data centre facility, and based on pre-configured criteria, rating the data centre facility according to the calculated Total Resource Utilization Efficiency. The TRUE rating system references several categories in calculating a TRUE score. The categories comprise Efficiency, Availability, Environmental Impact, Compute, and Storage. Efficiency in turn comprises Power Unit Efficiency (PUE) also known as Energy Efficiency, and Water Unit Efficiency (WUE). Availability in turn, comprises UPTIME percentage (%) based on total annual incident time. For example, 99.999% uptime is equal to 5 minutes 15.6 seconds of total annual down time. The Environmental Impact is calculated by aggregating several environment impact variables comprising CHG intensity, Carbon Intensity, Particle Matter Intensity, $SO_2/NO_x$ intensity, and Water treatment chemicals.

Environmental impact and sustainability is quantified using greenhouse gas (GHG) intensity per MWh, carbon intensity per MWh and particulate matter intensity per MWh. The intensity of each emission type is a measurement of the number of units (typically metric tons) produced per megawatt hour (MWh). GHG, $SO_2$, $NO_x$ and other emissions may be represented as carbon dioxide equivalent (CO2e).

The system or method may also be used to calculate carbon offsets or carbon credits. Renewable energy sources for example can be selected as the power source or as a percentage of the required power source with this being used to calculate the total carbon offsets or carbon credits that can be quantified as an annual number.

Water treatment chemical intensity is essentially a measure of how many units of different types of chemicals are used annually at a data center for water treatment and is calculated using the number of units used for water treatment per megawatt hour (MWh)

According to an embodiment, the intensity of the environmental impact variables is calculated in metric tons per megawatt hour of energy consumed. For example:

Green House Gas (GHG) intensity per MWh=metric tons/MWh

Carbon intensity per MWh=metric tons/MWh

Particle Matter intensity per MWh=metric tons/MWh $SO_2/NO_x$ intensity per MWh=metric tons/MWh Water treatment chemical intensity is calculated on an annual basis and is represented as litres per kWh or L/kWh.

According to an example embodiment, if the carbon intensity is 0.5 metric tons per MWh, you can use that to calculate the total amount of carbon produced annually. Thus 100,000 MWh*0.5 metric tons=50,000 metric tons of carbon produced annually operating the data centre.

Power usage effectiveness (PUE) is essentially a measure of how efficiently a data center uses energy; specifically, how much energy is used by the computing equipment in contrast to cooling and other overheads. PUE is the ratio of total amount of energy used by a computer data center facility to the energy delivered to computing equipment (compute system, storage system, networking system, etc.) Total Facility Energy equals everything beyond the Information Technology (IT) infrastructure (compute/storage/networking) equipment power usage.

Water usage effectiveness (WUE) is essentially a measure of how efficiently a data center uses water; specifically, how much water is used annually to cool the data center. Water usage effectiveness (WUE) is calculated using the number of liters of water consumed per kilowatt hour (kWh)

Compute and storage performance is determined using well known benchmarks to calculate the maximum compute performance and storage performance within the data center power and cooling specifications.

Location and climate zones are factors in determining environmental impact, PUE and WUE efficiency.

According to an embodiment, Compute implies compute performance, which preferably is calculated estimated by compute performance index per watt or kilowatt (KW) or megawatt (MW), etc. Preferably, compute performance index is based on a benchmark performance index multiplied by an average utilization per watts. The result is multiplied by 100.

Compute performance index per watt=(benchmark performance index*average utilization/watts)*100. This result represents a compute performance per watt value. Thus, for example if we have benchmark performance index of 150 and an average utilization of 0.70 and a total of 300 watts, our compute performance index is (150*0.70/300)*100=35. Any benchmark may be used as long as the same benchmark performance system or method is used for all compute performance index calculations.

According to an embodiment, in calculating and rating TRUE, Storage implies a storage performance index per watt or per kilowatt (KW) or per megawatt (MW), etc. Preferably, storage performance index is based on a benchmark performance index multiplied by an average utilization and divided by the total watts with the result multiplied by 100.

Storage performance index per watt=(benchmark performance index*average utilization/watts)*100. This result gives a storage performance per watt value. If the benchmark performance index is 150 with an average utilization of 0.70 and a total of 150 watts, our storage performance index is (150*0.70/150)*100=70. Any benchmark may be used as long as the same benchmark performance system or method is used for all storage performance index calculations.

Data center availability is essentially a measurement of the total annual downtime of a data center. This is a critical factor in determining risk assessment and evaluating overall data center performance. The availability index is an important factor to determine the data center operation efficiency since two data centers both built to the same Tier level can have very different operation efficiency ratings, with one data center never having outages and the other data center having multiple incidents causing data center outages.

Based on the determined values of multiple data center performance metrics, factors and indexes, the system or method calculates a date center performance rating. This is known as the data center TRUE score.

Other embodiments of this aspect include corresponding computer systems, apparatus, and computer programs recorded on one or more computer storage devices, each configured to perform the actions of the methods.

According to an embodiment each of the TRUE categories and sub-categories is rated from 0 to 5. With 5 as the top rating and 0 as the lowest rating. Each category is assigned a rating from 0 to 5 with the rating based on the average of all the sub-categories within. With each category rated the average of the aggregated ratings of each category is calculated to derive the TRUE score for the data centre. Preferably, each category is rated based on the average of the sub-category ratings.

According to an additional embodiment, each category and sub-category is assigned a weighted based on pre-defined criteria. The following are some example permutations. Variations and modifications are possible, even desirable, as would be apparent to a person having ordinary skill in the art.

Weighting

Sub-category ratings=rating/max rating=rating x.xx=rating percentage 0-100%.

Sub-category weighting=entire parent category accounts for 100% of weighting value, with each sub-category assigned a percentage of the total and all sub-category weighting percentages totalling 100%.

Category weighting=All categories combined account for 100% of weighting value, with each category assigned percentage of the total.

Calculating Score

Category rating base on SC ratings within that Category

Category ratings=rating/max rating=rating x.xx=rating percentage 0-100%

Category weighting=entire parent category accounts for 100% of weighting value, with each sub-category assigned a percentage of the total and all sub-category weights totalling 100%

All Category ratings are used to calculate TRUE score and expressed as a percentage with the perfect score being 100%

It is understood that newly defined data centre metrics, indexes, can be added to the methods and systems as a category or sub-category used to calculate a data centre TRUE score. The methods and systems are understood to be flexible and expandable, in order to accommodate future data center efficiency, availability, sustainability or other yet unknown key metrics.

Embodiments disclosed enable drastic reduction in power consumption through smart management of cooling power, and leveraging of environmental conditions to optimize cooling power consumption. Systems and methods disclosed enable huge savings in data center power consumption. Predictive analytics enable real-time computing power consumption estimation and thereby optimization of computing and cooling power consumption.

Embodiments disclosed include systems and methods that leverage multi-metric views that provide real-time actionable intelligence on data center performance and cooling performance. These multi-metric views attempt to take into account aspects of performance by bringing together the Power Usage Effectives (PUE) ratio, IT Thermal Conformance and IT Thermal Resilience thereby enabling real-time optimization through correlation of computing, infrastructure and cooling performance. Embodiments disclosed further enable nuanced and multi-dimensional metric that addresses the most critical aspects of a data center's cooling performance. To establish a more complete view of facility cooling, the requirement to calculate cooling effectiveness and the data centre's future thermal state is also critical. Embodiments disclosed enable easily scalable multi-dimensional metrics that and that can accommodate additional new metrics in the future, as they are defined.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus, it will be understood by those skilled in the art of infrastructure management, and more specifically automated infrastructure management especially pertaining to data centers, that although the preferred and alternate embodiments have been shown and described in accordance with the Patent Statutes, the invention is not limited thereto or thereby.

The figures illustrate the architecture, functionality, and operation of possible implementations of systems, methods and computer program products according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to automated power management and optimization in data centers, the system and process is highly reconfigurable, and may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A computer automated system configured to:
adaptively, in real-time, determine based on an operating condition of a power unit, a water unit, a compute system, a storage system, and a power management system housed in a data center facility, a Total Resource Utilization Efficiency (TRUE) of the data center facility;
based on the determined Total Resource Utilization Efficiency (TRUE), calibrate at least one of the power unit, the water unit, the compute system, the storage system, the power management system and the operating condition of the data center facility;
determining an environmental impact wherein in determining the environmental impact the computer automated system is further configured to:
aggregate a plurality of environmental impact variables comprising greenhouse gas (GHG) intensity, Carbon Intensity, Particle Matter Intensity, SO2/NOX intensity, based on a number of units produced per megawatt hour (MWh); and
determine a water treatment chemical intensity, based on the number of chemicals used annually at the data center for water treatment, calculated using a number of liters of chemicals used for water treatment per kilowatt hour (kWh) or L/kWh.

2. A computer automated system configured to:
adaptively, in real-time, determine based on an operating condition of a power unit, a water unit, a compute system, a storage system, and a power management system housed in a data center facility, a Total Resource Utilization Efficiency (TRUE) of the data center facility; and
based on the determined Total Resource Utilization Efficiency (TRUE), calibrate at least one of the power unit, the water unit, the compute system, the storage system, the power management system and the operating condition of the data center facility;
based on the determined real-time operating condition of the compute system, calibrate the compute system to operate at a load that allows maximum energy efficiency; and
wherein the calibrating is based on a pre-defined data management policy comprising determining data to retain and a retention period required for the retained data, and accordingly determining data to migrate to another compute system; and
wherein in calibrating the compute system, the computer automated system is further configured to optimize compute performance index which comprises a benchmark performance index multiplied by an average utilization per watt, the result of which is multiplied by 100.

3. A computer implemented method comprising:
adaptively, in real-time, determining based on an operating condition of a power unit, a water unit, a computer system, a storage system, and a power management system housed in a data center facility, a Total Resource Utilization Efficiency (TRUE) of the data center facility;
based on the determined Total Resource Utilization Efficiency (TRUE), calibrating at least one of the power unit, the water unit, the compute system, the storage system, the power management system and the operating condition of the data center facility;
wherein determining the Total Resource Utilization efficiency further comprises:
optimizing the power unit efficiency or power usage effectiveness (PUE) which comprises:
determining a total power requirement of the facility;
determining a total power requirement of the input-output system, the compute system and the storage system comprised in the facility;
determining a total area occupied by the facility;
aggregating the total power requirement of the input-output system, the compute system and the storage system; and
determining and displaying a result comprising the total power requirement divided by the aggregated total power requirement of the input-output system, the compute system and the storage system and further multiplied by the reciprocal of the determined total area occupied by the facility.

4. A computer implemented method comprising:
adaptively, in real-time, determining based on an operating condition of a power unit, a water unit, a computer system, a storage system, and a power management system housed in a data center facility, a Total Resource Utilization Efficiency (TRUE) of the data center facility;
based on the determined Total Resource Utilization Efficiency (TRUE), calibrating at least one of the power unit, the water unit, the compute system, the storage system, the power management system and the operating condition of the data center facility, and determining an environmental impact based on a plurality of environmental impact variables comprising a greenhouse gas (CHG) intensity, a Carbon Intensity, a Particle Matter Intensity and an SO2/NOX intensity, wherein, in determining the environmental impact, the method comprises:

aggregating the plurality of environmental impact variables comprising the greenhouse gas (GHG) intensity, the Carbon Intensity, the Particle Matter Intensity, and the SO2/NOX intensity, based on a number of units produced per megawatt hour (MWh); and determining a water treatment chemical intensity, based on a number of units of chemicals used annually at the data center for water treatment, calculated using the number of units used for water treatment per megawatt hour (MWh).

5. A computer implemented method comprising:

adaptively, in real-time, determining based on an operating condition of a power unit, a water unit, a computer system, a storage system, and a power management system housed in a data center facility, a Total Resource Utilization Efficiency (TRUE) of the data center facility;

based on the determined Total Resource Utilization Efficiency (TRUE), calibrating at least one of the power unit, the water unit, the compute system, the storage system, the power management system and the operating condition of the data center facility; and determining an environmental impact based on a plurality of environmental impact variables comprising at least one of a greenhouse gas (GHG) intensity, a Carbon Intensity, a Particle Matter Intensity and an SO2/NOX intensity wherein the method further comprises:

based on the determined real-time operating condition of the compute system, calibrating the compute system to operate at a load that allows maximum energy efficiency; and wherein the calibrating is based on a pre-defined data management policy comprising determining data to retain and a retention period required for the retained data, and accordingly determining data to migrate to another compute system; and wherein in calibrating the compute system, optimizing a compute performance index which comprises a benchmark performance index multiplied by an average utilization per watt, the result of which is multiplied by 100.

* * * * *